June 4, 1963 C. M. DE WOODY ETAL 3,092,704
RESISTANCE COATING FOR ARTICLES OF GLASSWARE AND THE LIKE
Filed Dec. 28, 1959 2 Sheets-Sheet 1
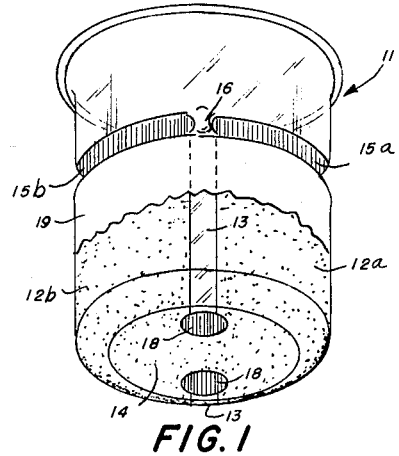
FIG. 1
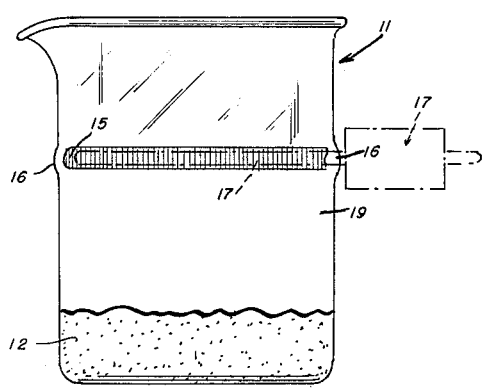
FIG. 2
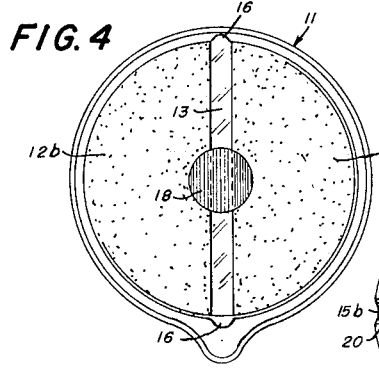
FIG. 4
FIG. 5
FIG. 6
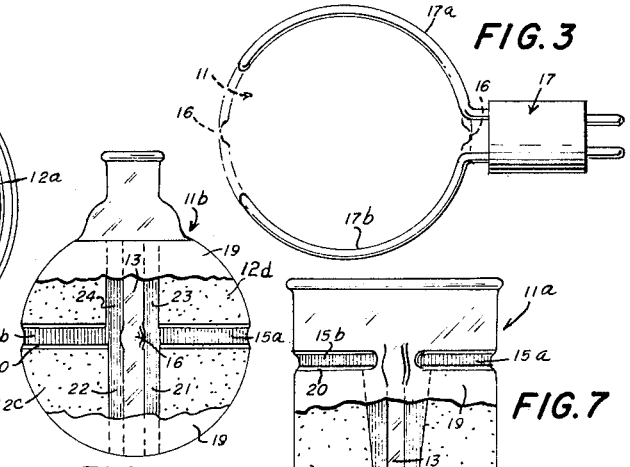
FIG. 3
FIG. 9
FIG. 7
FIG. 8
FIG. 10
INVENTORS
CHARLES M. DEWOODY
ROSCOL L. PEARCE
WALTER MUELLER
EUGENE A. EGIZI
BY
ATTORNEY June 4, 1963  C. M. DE WOODY ETAL  3,092,704
RESISTANCE COATING FOR ARTICLES OF GLASSWARE AND THE LIKE
Filed Dec. 28, 1959  2 Sheets-Sheet 2
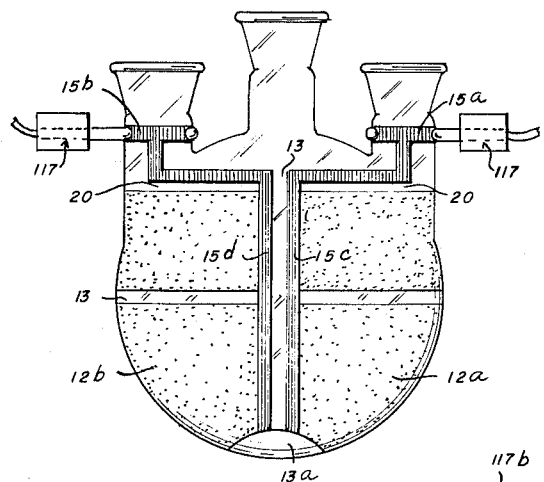
FIG. 11
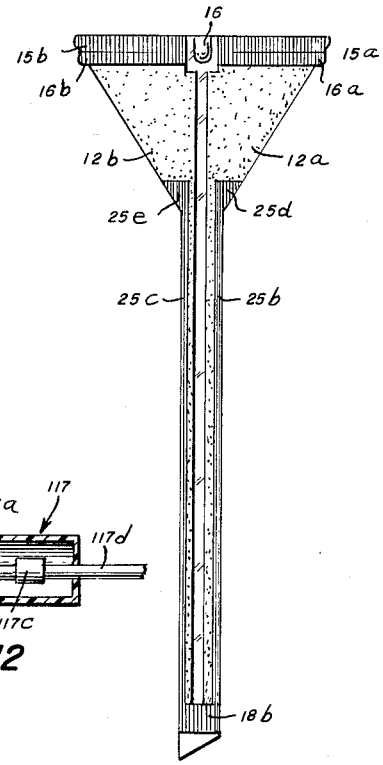
FIG. 14
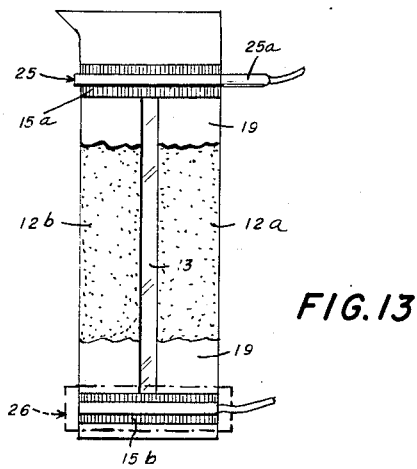
FIG. 13
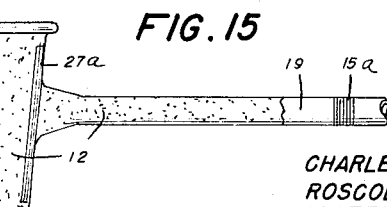
FIG. 12
FIG. 15
INVENTORS
CHARLES M. DEWOODY
ROSCOL L. PEARCE
WALTER MUELLER
EUGENE A. EGIZI
BY
ATTORNEY United States Patent Office 3,092,704
Patented June 4, 1963

3,092,704
RESISTANCE COATING FOR ARTICLES OF GLASSWARE AND THE LIKE
Charles M. De Woody, Roscol L. Pearce, and Walter Mueller, Cumberland County, and Eugene A. Egizi, Camden County, N.J., assignors to Ace Glass Incorporated, Vineland, N.J., a corporation of New Jersey
Filed Dec. 28, 1959, Ser. No. 862,331
5 Claims. (Cl. 219—19)

This invention relates to the field of laboratory glassware and the like, and consists more particularly in new and useful improvements in an electrical resistance coating for heating glass ware.

An object of the invention is to provide economical means for heating glassware and the like, by selectively distributing the current in a resistance coating applied to the periphery of the glassware.

Another object of the invention is to provide a heating vessel capable of producing higher temperatures with greater safety than is possible with conventional equipment.

Still another object of the invention is to provide a resistance coating for heating glassware and the like, designed to minimize the occurrence of hot spots which cause local superheating and/or provide desirable temperature gradients.

A further object of the invention is to provide a unit of glassware having an integral heating means incorporated therein in the form of a resistance coating to thereby facilitate convenience of use.

Still another object of the invention is to provide a resistance coating for heating glassware, comprising broad bands of resistance material to attain a maximum surface coverage and simultaneously provide basic circuitry for more accurate control of the distribution of current in both symmetrical and non-symmetrical objects while using a practically uniform thickness of coating of resistance material, when desirable, at least one form of said coating being capable of producing high temperatures with low voltage inputs and providing practically instantaneous response to voltage changes.

Another object is to provide a resistance coating for vessels, comprising broad bands of resistance material including means for providing shunt circuits or short circuits at selected locations to minimize the development of hot spots and/or provide desirable temperature gradients.

A further object of the invention is to provide means for positively locating and retaining the electrical contacts necessary for the use of the vessels.

It is also an object of the invention to provide a support-clamp with combined electrodes for supporting and energizing a resistance coated unit of glassware, although this is not necessary to the practice of the invention in its broadest concept.

A still further object is to provide a unit of glassware having a resistance coating and an integral insulation having heat and chemical resistant properties.

Another object is to provide a vessel having an electrical resistance coating and an integral heat and chemical resistant insulation having resilient properties.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a perspective view of a laboratory beaker representing one unit of glassware embodying the present invention, the insulating jacket being broken away to show the resistance coating;

FIG. 2 is a view of the beaker in side elevation, showing the support-clamp and electrical contacts in dotted lines;

FIG. 3 is a plan view of the support-clamp contacts, showing the beaker in dotted lines;

FIGS. 4, 5 and 6 illustrate different modifications in the application of the resistance coating, as viewed from the bottom of the units of glassware;

FIG. 7 is a view in side elevation showing a round bottom flask embodying a modified application of resistance coating;

FIG. 8 is a bottom view of the vessel shown in FIG. 7;

FIG. 9 is a side elevational view of a bulb-type vessel embodying a still further modification, comprising separate upper and lower resistance coating sections applied to the periphery of the unit of glassware;

FIG. 10 is a bottom view of the unit shown in FIG. 9;

FIG. 11 shows a modified form of the invention as applied to a three-neck boiling flask;

FIG. 12 is a detail showing a modification of the contact shown in FIG. 3, for use with the vessel shown in FIG. 11;

FIG. 13 illustrates an application of the invention to a test tube-like vessel;

FIG. 14 shows a further modification of the invention as applied to a funnel; and FIG. 15 shows a stopcock barrel coated with resistance material in accordance with the invention.

Briefly, the invention consists in applying to the outer periphery of a unit of glassware, or similar normally non-conducting surface, a film or coating of resistance material arranged in a complete conducting circuit in one or more broad bands which are discontinuous around the periphery and/or intercepted by integral shunt configurations, and which have terminal and/or integral shunt means not continuous around the major periphery, said terminal and shunt being preferably formed of a metallic coating of lesser resistance, and the terminal means adapted to receive opposed contact members or electrodes between which electrical current flows to heat the unit in a controlled pattern of heat intensity.

Considering the invention in greater detail and referring first to FIGS. 1 and 2, the vessel, in this case a beaker, is generally represented by the numeral 11 and may be formed of any suitable laboratory-type glass, such as Pyrex 7740 glass. A thin coating or film of electrical resistance material 12 is applied to the periphery of the beaker 11 in the form of two broad peripheral bands 12a and 12b, separated from one another on opposite sides of the beaker by longitudinally extending gaps or spaces 13, running down the side walls of the beaker and partially across the bottom, so as to leave an uninterrupted connecting area 14 which completes the conducting circuit as will later appear.

Adjacent the upper boundaries of the bands 12a, 12b, the beaker 11 may be circumferentially recessed to provide grooves 15a and 15b, although such grooves are not necessary in the broadest scope of the invention, and the surfaces of these grooves are coated with a metal of less resistance than the coating 12. The metallic coatings of the grooves 15a, 15b are in electrical contact with the respective coating bands 12a, 12b and form opposite terminals for the conducting circuit. Preferably, the adjacent ends of the grooves 15a, 15b are separated by glass knobs or crimps 16 which not only insure the isolation of the respective terminals, but facilitate the installation and positioning of the electrical contacts which are received by the grooves 15a, 15b as hereinafter referred to.

Preferably, the resistance coating 12 consists of platinum applied by spraying one or more coats of a solution containing platinum and baking in an oven at temperatures in excess of 1100° F. after the coating is dried. The thickness of the resulting metallic platinum or platinum alloy coating may vary but generally should not exceed .0015 inch and should not be less than .0003 inch. It will be understood that while platinum is preferred, various other metals such as silver, tin, aluminum and gold may be used, the thickness of which will vary with the metal used. For instance, a coating resulting from a tin salt may be in the order of 0.000016 inch.

The terminal and shunt coatings such as in grooves 15a, 15b and 18 are preferably of silver and of a thickness in the order of 0.008 inch and generally not less than 0.003 inch. In any event, the thickness of the terminals should be greater than that of the coating 12, and, if desired, the terminal coating may be of the same material as that employed in the resistance coating, but in this case, the subsequent coats are applied in localized well defined geometric patterns.

A combined support-clamp and electrical connecting device 17, adapted to be connected into any suitable outlet, carries a pair of opposed contacts 17a and 17b, preferably composed of brass wire of arcuate configuration to fit within the respective terminal grooves 15a, 15b and support the vessel, as shown in FIGS. 2 and 3. There it will be seen that the knobs or crimps 16 previously referred to, facilitate the proper installation of the contacts 17a, 17b.

The application of current through the contacts or electrodes 17a, 17b to the terminals 15a, 15b results in current flowing down one of the bands of resistance material 12, across the bottom area 14, and up the other band, and for the duration of the flow of current through this circuit, the resistance coating 12 causes the uniform heating of the beaker throughout its coated cylindrical contour, and a more intense heating of the bottom contours because of the narrowed band in this section.

It is desirable to have a lower temperature on the side walls in vessels where evaporation is caused in order to reduce or eliminate decomposition of material spattered thereon in the course of evaporation. The temperature of the bottom is therefore raised in relation to the upper walls by narrowing the resistance band.

However, when current flow is relatively high, such as in the passage of 5 amperes or more through the narrowed portion, or connecting passage, hot spots tend to develop adjacent the extremities of the gaps 13. In order to obviate this difficulty, it has been found that by providing a shunt circuit or short circuit at selected locations adjacent the gap between the coating bands 12a and 12b, and establishing an area of reduced resistance where the overheating would most likely occur, the current is caused to by-pass through the lesser resistance and induce a cooling effect in the area around it. As shown in FIG. 1, at the lower extremity of each of the gaps 13, an area 18 on the surface of the glass beaker bottom is coated with silver, of a thickness substantially the same as the silver coating of the terminal grooves 15a, 15b. Thus, with the resistance at these points reduced, the current by-passes the critical area and at the same time, is redistributed over substantially the entire bottom, forming straight line paths to the terminal bands 15a, 15b on the side walls of the beaker.

An insulating jacket 19 overlying the coating 12 completes the unit. This jacket is preferably formed by dipping the resistance coated vessel in silicone rubber catalyzed latex and curing to a resilient form with heat, or applying any suitable high temperature electrical insulation, such as a ceramic glaze or silicone resin. Silicone rubber has been found to possess the desired insulating properties and its resilience also serves the added purpose of protecting the glassware against breakage. However, other materials having these properties could obviously be used.

Depending upon the intended use of the article of glassware, the system of forming the bands of resistance material and the shunt circuits is subject to numerous variations. For example, FIG. 4 shows a generally similar resistance coating for a beaker, round bottom flask, culture dish, or similar article, but instead of providing an uninterrupted resistance coating area such as 14 in FIG. 1, this modified form comprises two completely separated coating bands 12a, 12b spaced by a continuous gap 13 which extends down both sides of the vessel and across the bottom. However, in this particular embodiment, a single shunt circuit of silver 18 overlies the gap 13 on the bottom of the vessel and establishes electrical contact between the two bands 12a and 12b to complete the circuit. At the same time, the shunt circuit 18, being of lesser resistance than the bands 12a, 12b provides an area of reduced resistance where the overheating of the vessel would most likely occur and prevents the development of hot spots in the bottom of the vessel, while simultaneously providing a temperature gradient which is substantially uniform.

It will be understood that under some circumstances, the shunt circuit is not required and such an embodiment of the invention is shown as in a beaker bottom in FIG. 5. Here, instead of two bands of resistance coating separated on both sides of the vessel, as previously described, the resistance coating 12 is applied over the entire area of one side of the vessel and its bottom, terminating on the other side in a space or gap 13 which extends down that side and partially across the bottom where it ends in an enlarged clear area 13a located centrally of the bottom of the vessel. In this form of the invention, the flow of current is circumferentially of the vessel, from one side to the other thereof through terminal strips (not shown) extending downward from 15a and 15b along 13, similar to those shown in FIG. 8.

A still further modification of the shunt circuit for preventing hot spots is illustrated in FIG. 6 where it will be seen that the vessel is provided with the two broad bands 12a, 12b of resistance material, separated on both sides of the vessel and partially across the bottom thereof, by gaps 13, generally similar to the embodiment shown in FIG. 1. However, instead of the circular disc-like shunt circuits 18 of FIG. 1, the FIG. 6 embodiment comprises substantially arcuate shunt circuits 18a, at the bottom extremities of respective gaps 13. These arcuate elements 18a consist of coatings of silver or other material of less resistance, applied to the bottom of the vessel 11 in electrical contact with the respective bands 12a, 12b. Thus as the current flows down one side wall, over the bottom and up the other side wall, the reduced resistance of the intercepting shunt strips 18a cause some of the current to by-pass the enclosed area, preventing the development of hot spots, particularly in larger vessels, while creating substantially uniform resistance paths to the terminals 15a and 15b. It may be seen that without these distributing arcuate strips, most of the current would flow in the shortened resistance paths around the terminations of 13 and the distance between terminations would be critical. Also, in large vessels, it is less desirable to provide voids 13a or large central spots 18 because these create almost totally unheated areas, while termination spots 18 as in FIG. 1 are more local and hence more critical spacing is again required. This configuration 18a is also well adapted to multiple bands where a number of uncoated strips 13 may be present. Radial extensions of 18a may also be utilized as distributors where irregularities exist, such as in creased flasks.

FIGS. 7 and 8 represent a further modification in the adaptation of this invention to a low wattage round bottom flask 11a. As in the case of the form shown in FIG. 5, a single gap 13 on one side of the vessel spaces the extremities of the platinum coating 12 which extends entirely around the opposite side of the vessel, said gap terminating in an enlarged circular clear area 13a in the central portion of the bottom surface of the vessel.

In this form, it will be noted that the upper extremity of the coating 12 is spaced as at 20 from the adjacent edges of the terminal bands 15a, 15b which, as in the embodiments previously described, are separated from one another at both ends, by clear glass knobs or crimps 16, or at least by clear non-conducting spaces. Contact with the respective sides of the coating 12 is effected by extending the silver coating of the terminal bands 15a, 15b downwardly along the sides of the gap 13 as at 15c and 15d respectively. Preferably, these extensions or conductive leads 15c, 15d which are in electrical contact with the coating 12 at the respective edges of the gap 13, are tapered from their points of connection to the respective terminal bands, to the proximity of the enlarged clear space 13a on the bottom of the vessel. This provides greater current carrying capacity as 15a and 15b are approached, eliminating "hot strips." The tapered construction is used primarily on small vessels where strip width could be a significant portion of the area. The narrow end of the taper may extend to the edge of 13a, or stop short of it, depending on size; operating temperature and the resistance of the coating.

The coatings have been applied to vessels as small as 1 ml. and as large as 12,000 ml. but are not restricted to these limits, and it can be readily understood that with such a spread, individual problems require a versatility that can be met only by providing variable circuitry.

In some applications of this invention, such for example as in a bulb-type boiling flask as shown in FIGS. 9 and 10, it is desirable to heat both the upper and lower portions of the vessel by means of the coating of resistance material. Such a vessel is shown at 11b and it will be seen that the usual terminal bands 15a, 15b are provided in complimentary grooves located centrally of the periphery of the vessel. These terminal bands are spaced as at 20 from separate sections of coating 12c and 12d, the former substantially covering the bottom of the vessel and the latter covering the major portion of the upper periphery of the vessel. The usual space or gap 13 extends around one side of the vessel and partially across the bottom, separating the adjacent edges of the coating sections 12c, 12d which extend completely around the other side of the vessel. The gap 13 terminates at the bottom of the vesesl in an enlarged area 13a.

Electrical contact between the terminal bands 15a, 15b and the respective sections of coating 12c, 12d is effected by extending the terminal bands to form leads 21 and 22, along the edges of gap 13, adjacent the bottom section coating 12c, and similarly extending the bands to form leads 23 and 24, for completing the circuit in the upper section of coating 12d.

With large vessels or irregular vessels such as some vertically creased flasks, funnels, and stopcocks, it is impractical to provide a groove for the reception of a connector of the preferred type which also acts as a support. FIGS. 11–15 inclusive illustrate how such variations may be employed without departing from the spirit of the invention.

FIG. 11 represents a large capacity three-neck boiling flask with grooves 15a and 15b provided in the respective side necks. As in the case of the vessel shown in FIG. 7, here also, the silver coating of the terminal bands in grooves 15a and 15b are extended downwardly along the sides of the gap 13 as at 15c and 15d, to the proximity of an enlarged clear space 13a. Instead of the combined clamp contact shown in FIG. 3, the boiling flask employs contact devices 117 shown in detail in FIG. 12. Here it will be seen that a hollow plastic tube 117a carries a brass hook-shaped wire 117b at one end, connected within the tube at 117c to an insulated electric wire 117d. As seen in FIG. 11, one of these devices 117 is connected to each of the grooves 15a and 15b in the necks of the flask.

FIG. 13 represents a test tube-like vessel with a flat bottom and a parallel circuit varying slightly from that shown in FIG. 11. Terminal bands 15a and 15b are present but no grooves are provided. Instead, flat connectors 25 are wrapped around the terminals and held tightly in electrical contact by means of a bolt as at 25a or a tight fitting silicone rubber band as shown by dotted lines at 26 at the bottom of the test tube. Contacts as at 25 usually require that they be insulated which is done by applying silicone rubber latex, as formerly, to the unit, but now including the terminals. Contacts as at 26 may have an insulated wire piercing the silicone rubber band and so need no further insulation.

FIG. 14 illustrates a funnel with terminal bands 15a and 15b, and a terminal shunt band 18b which completes a circuit from resistance coating 12a to 12b, but which also may be used as a terminal band to create a parallel basic circuit.

In the latter case, the contacts 17a and 17b (FIG. 3) which fit above ridges 16a and 16b (FIG. 14) are both connected to one side of the power supply and terminal shunt band 18b to the other side. The advantage of this arrangement is the degree of versatility that it provides; a basic series circuit is available for low wattage, fine control, plus a parallel circuit which doubles the available wattage when unusual amounts of heat are needed. A metal wrap-around connector band with a silicone rubber holding band over it is preferred for use with the terminal shunt band 18b, since the metal band may be removed and the insulating band remains.

The lower cone and stem of the funnel have shunts 25b and 25c in electrical contact with resistance coatings 12a, 12b, and usually 18b. The shunts are essentially planar, funnel-shaped configurations as at 25d and 25e but are not necessarily limited to this configuration. They are used to regulate the relative temperature of the lower cone and stem in the following manner:

Without the shunts, the indicated areas tend to operate at a higher temperature than the upper funnel and are increasingly sensitive to slight differences in film thickness as the wattage increases, tending to create "hot bands" around the stem. This is partly because the film resistance is kept low so that low and relatively safe voltages may be employed. High current values are therefore necessary to obtain desired wattages. The temperature resistance characteristics of the film determine its operating temperature when other conditions are constant.

Platinum has a high temperature coefficient of resistance and is therefore somewhat more sensitive to variations in thickness than some other materials. However, its ability to form integral bonds with the glazed surface, its ductility and advantageous coefficient of expansion, its high chemical inertness particularly to oxidation, its ease of repair if damaged, and its high power capacity, permitting watt densities of 25 watts/in.$^2$ with appropriate film thickness, make it a preferred material.

Integral shunt circuits which are in electrical contact over substantially their whole area are an extremely expeditious manner of handling the problems which arise with platinum and platinum alloys and offer advantages with the use of other materials, since current may be bypassed and directed from one location to another where it can be better utilized. Silver shunts in particular are capable of conducting both heat and electrical current away from and around high resistance potential hot spots and redistributing to lower temperature, lower resistance areas along their paths. In addition to this they act in the usual manner of an electrical shunt but carry current at a lower temperature than the platinum; the resistivity of silver is 1.6 in relation to 9.8 for platinum in pure states. The result is that the shunts can be made to provide a more uniform temperature or establish a temperature gradient in the area in which they are placed. Various silver compositions and thicknesses may be applied to produce the desired results, compatible ground glass usually being added as a diluent.

The compositions and width of the shunt strips 25b and 25c are selected together with the width of void strips 13 to draw heat from 12a and 12b. The shape of 25d and 25e is selected to intercept a proper proportion of current to regulate the relative temperature of the stem and lower cone section. The current being purposely directed to the places where it is most needed, removes limiting resistances and permits highest possible wattages to be used.

FIG. 15 illustrates a stopcock barrel with side arms attached, which is coated with resistance material 12, in a continuous coating from terminal 15a to 15b. Terminal connectors such as 25 are used on small sizes and the usual groove with contact connector 117 (FIG. 12) on large sizes.

Without shunt strips 27a and 27b, current tends to flow in a straight line across the barrel. With these shunt strips most of the current is intercepted and redistributed so that the barrel is heated more uniformly. This same type shunt can be applied to vessels with projecting arms.

The basic principle of operation in all of the foregoing embodiments of this invention is substantially the same and it will be understood that these are simply illustrative of numerous possible adaptations of the invention. It will be apparent that by providing an electrical resistance film or coating which will not crack or peel off, such as a noble metal bonded to the surface, and arranging said coating in an electrically conducting circuit in the form of broad bands or strips which either are discontinuous around the periphery in that they have one or more splits or bare areas which define the circuit boundaries, or, covering the whole periphery, are provided with integral electrically contacting shunt/distributor configurations at selected locations between the terminals for the purpose of providing a controlled pattern of heat intensity and not acting solely as terminals, or discontinuous bands as above together with said shunt/distributor configurations, and having terminal means for positively locating and retaining electrical contacts, that units of glassware and the like may be heated under controlled and safe conditions. The protective jacket of bonded electrical insulation which is unnecessary at safe voltages below 6 volts also is heat and chemical and abrasion resistant, and with the provision of support-clamp contact electrodes affords a practical and very conveniently handled article of laboratory heating glassware or the like, the temperature of which can be raised to 700° C. in at least one of its forms.

In the claims, the term "article of glassware or the like" is intended to include glass coated, or vitreous enamelled metal and similar materials as a base for the resistance coating.

From the foregoing, it is believed that the invention may be readily understood by those skilled in the art without further description, it being borne in mind that numerous changes may be made in the details disclosed without departing from the spirit of the invention as set forth in the appended claims.

We claim:

1. A heating unit comprising a container of glassware or the like having a surface thereof coated with an electrical resistance material, said coating being divided along a predetermined path to form separate conducting areas of an electric circuit, the periphery of said container adjacent the boundary of said coating being recessed on opposite sides to provide terminal grooves, separate coatings of a material of less resistance than said first-named coating, lining said grooves and electrically connected to respective conducting areas, and a support for said container comprising a body, and electrodes carried by said body engageable in respective terminal grooves in supporting engagement with said container.

2. A hollow article of glassware or the like, having the periphery thereof coated with an electrical resistance material, said coating forming at least one enveloping resistance band, the outer boundaries of which are defined by at least one uninterrupted non-coated channel, juxtaposed terminal means on said article, separated by said non-coated channel and respectively connected to opposite ends of said band, to complete an electric circuit, and means contiguous with said non-coated channel, for cooling the adjacent surface of the article.

3. A hollow article of glassware as claimed in claim 2, including a shunt circuit contiguous with said non-coated channel, for cooling the adjacent surface area of said article.

4. A hollow article of glassware as claimed in claim 3, wherein said shunt circuit consists of a coating of a material of less resistance than said first-named coating.

5. A hollow article of glassware or the like, having the periphery thereof coated with an electrical resistance material, said coating forming at least one enveloping resistance band, the outer boundaries of which are defined by at least one uninterrupted non-coated channel, predetermined areas of the surface of said article being contoured to receive electrical connectors, said contoured areas being coated with a material of lesser resistance than that of said band, to provide juxtaposed terminal means, separated by a portion of said non-coated channel and respectively connected to opposite ends of said band to complete an electric circuit, and offset means adjacent said contoured areas, for positioning said connectors.

References Cited in the file of this patent

UNITED STATES PATENTS

| | | |
|---|---|---|
| 1,978,089 | Jones | Oct. 23, 1934 |
| 2,440,691 | Jira | May 4, 1948 |
| 2,527,854 | Wiedenschilling | Oct. 31, 1950 |
| 2,557,983 | Linder | June 26, 1951 |
| 2,609,478 | Crawford et al. | Sept. 2, 1952 |
| 2,705,749 | Daily et al. | Apr. 5, 1955 |
| 2,710,900 | Linder | June 14, 1955 |
| 2,715,668 | Booker et al. | Aug. 16, 1955 |
| 2,761,945 | Colbert et al. | Sept. 4, 1956 |
| 2,883,307 | Orr | Apr. 21, 1959 |
| 2,915,613 | Norton | Dec. 1, 1959 |

FOREIGN PATENTS

| | | |
|---|---|---|
| 739,123 | France | Oct. 24, 1932 |
| 144,464 | Austria | Jan. 25, 1936 |

OTHER REFERENCES

E-C Coated Tubes, Corning Glass Works; Form B-90, June 1954.